June 20, 1950   N. S. STERN   2,512,042
SLIDE CALIPER
Filed Jan. 31, 1946
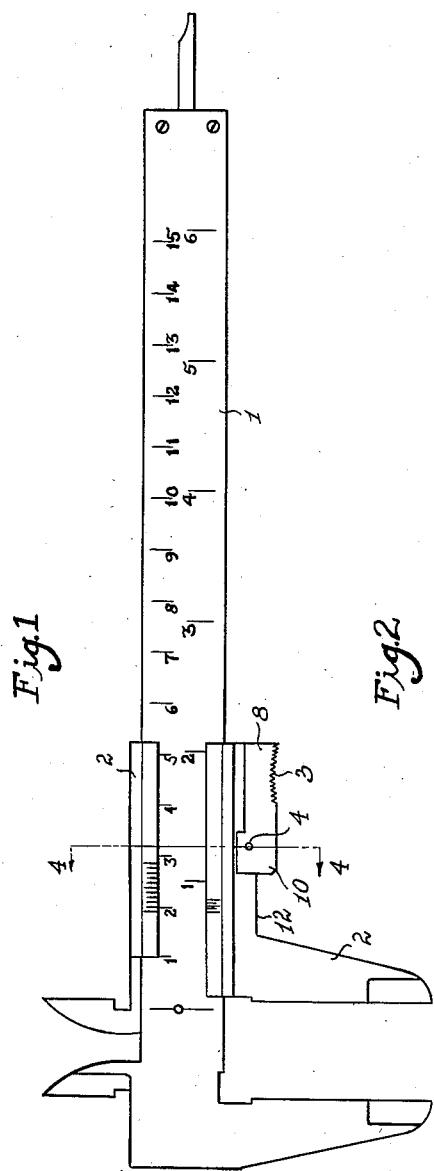
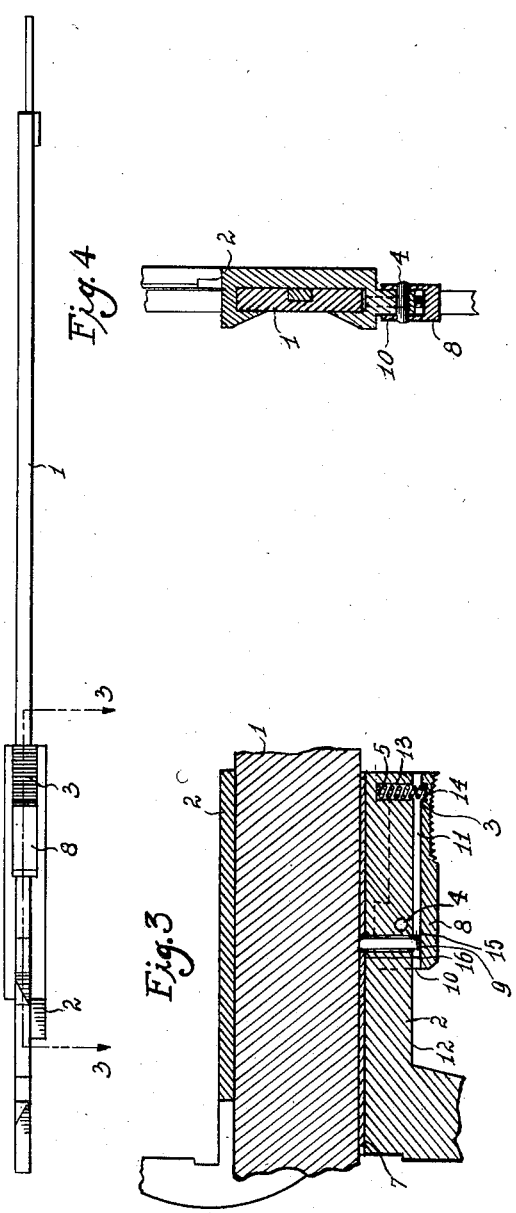
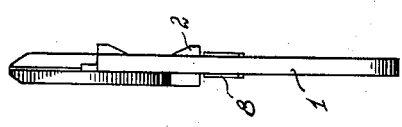
INVENTOR
NATHAN SALLY STERN
BY
ATTORNEY Patented June 20, 1950

2,512,042

UNITED STATES PATENT OFFICE 2,512,042

SLIDE CALIPER

Nathan Sally Stern, New York, N. Y., assignor to American Measuring Instruments Corporation, New York, N. Y.

Application January 31, 1946, Serial No. 644,633

6 Claims. (Cl. 33—143)

The invention relates to calipers having a vernier scale moved along a scale blade; it is however applicable to all types of measuring instruments where a slide member is displaced relative to a scale member.

In the use of these measuring instruments the requirement arises to lock the mutually movable parts and particularly also the slider relative to the scale member in a desired position. To answer this requirement a great variety of locking devices have been devised and practiced; however, those known locking devices lack in ease of handling, they do not function swiftly, they do not offer the necessary operative precision and are too expensive for mass production.

It is the primary object of the invention to provide a locking device for calipers and particularly those calipers where a vernier scale is displaced in relation to a scale blade which combines the requirement of operating accuracy and a maximum of handling simplicity.

It is another object of the invention to produce calipers of the above named type which have a reliable locking function.

It is another object of the invention to provide calipers which by a very simple manipulation may be brought into the locking position and released therefrom.

It is an important object of the invention to produce a locking device for calipers which is of a very simple construction and therefore may be mass manufactured at a minimum of costs without a reduction of its functioning reliability.

With these and further objects in view which will become apparent as this application proceeds, a preferred embodiment of this invention is illustrated in the accompanying drawing.

In the drawing:

Fig. 1 is a side elevation of calipers embodying the invention,

Fig. 2 is a bottom view of the same,

Fig. 3 is a vertical sectional elevation on line 3 to 3 of Fig. 2, and

Fig. 4 is a vertical sectional elevation on line 4 to 4 of Fig. 1 and

Fig. 5 is an end elevation.

The measuring device shown in the drawing consists of two main elements which are the scale blade 1 and slider 2 provided with a vernier scale; the slider 2 encases the scale blade 1 for longitudinal displacement; a gib 7 is provided in the customary manner between slider 2 and scale blade 1. Further description of the calipers which insofar do not differ from the usual type is not deemed to be necessary.

The device which is used in conformity with the invention to lock the slider 2 in a desired position relative to the blade scale 1 is applied to a side of the slider which in the following will be called "its underside"; it is indicated on the drawing by the lower border line 12.

The device consists of a two arm lever clamp 8 which is U-shaped in cross section, Fig. 4, and embraces the underside portion of the slider; the left end part of the lever clamp is shaped to form an enlargement 10.

The two arm lever clamp 8 is rotatably supported on a retaining shaft 4 which is rigidly mounted in the slider 2; the shaft protrudes on both sides over the width of the slider to form a support for the rotatable lever clamp 8.

The right end portion of the lever clamp 8 is resiliently connected with slider 2 in such a manner that a constant pressure is exerted upon this end by spring 5; this spring has its upper main portion located in a bore 13 of slider 2 and its lower end in a recess 14 of the clamp lever 8 which recess is alined with the bore 13.

Compression spring 5 abuts with its ends against the upper inner face of bore 13 and the lower inner face of recess 14.

The underside 12 of the slider 2 and the clamp lever 8 are positioned at a short spaced relationship, spring 5 traversing this space 11.

A bore 15 extending substantially at a transversal direction to the direction of the slider displacement is provided in the slider, the bore passing through the lower portion of the slider 2; a bore 16 which is alined with bore 15 is provided in gib 7; a loose seat is formed in the slider by the two bores for a pin 9; the clamp lever which is pressed downward by the action of spring 5 on its right end portion and thereby rotated about shaft 4 forces the pin 9 against the scale blade 1; the thus created braking action locks the slide 2 in a desired position relative to the scale blade. A serrated indentation 3 is provided at the underside of the right end portion of the clamp lever acted upon by the spring 5. This indentation facilitates the exertion of pressure on the clamp lever by the operator if the lever is to be released from the locking position.

The operation of the above described locking device is as follows.

In order to displace the slide 2 along scale blade 1 pressure is exerted by the operator onto indentation 3, the spring is compressed, the lever is slightly rotated in a counterclockwise direction, the pressure of pin 9 towards scale blade is released and the slider can be moved freely.

If it is desired to lock the slider 2 in a desired position relative to scale blade 1 the pressure exerted onto the indentation is interrupted whereupon the lever 8 is rotated in a clockwise direction about shaft 4 and the pin 9 is pressed against the scale blade; the thus created braking effect secures the locking position of the device.

In addition to its function as a simple but reliable locking device the pin 9 accomplishes the following important purpose. It secures without the application of any other means of fixation the proper position of the gib 7 and prevents movement of the same relative to the slider 2. The locking and gib securing function is achieved with a minimum of parts, each having a possibly simple shape and therefore adapted to greatly reduce the machining operations and costs. The locking pin only requires the drilling of a cylindrical bore for its location in the slider, whereby expensive and difficult slot producing operations are eliminated which are hitherto required to accommodate the locking elements of calipers. Another important advantage of the invention resides therein that the strength of the slider remains practically unimpaired by the small bore 15 for pin 9, whereas the sliders are often weakened by the provision of large slots recessed from the same in conformity with known locking devices.

In spite of its constructional simplicity the invention provides a reliable and inexpensive solution of the problem of transmitting by means of a rotatable lever a locking action from a spring through the body of the slider to the scale blade to which the braking or locking action is applied.

As different embodiments of this invention may be made without departing from the spirit and scope thereof, it is to be understood that I do not limit myself to the specific embodiments shown except as defined in the appended claims.

What I claim is:

1. A locking device for calipers having a scale blade and a slider which are displaceable relative to each other comprising a clamp lever rotatably supported on the slider, said slider having a bore extending in a direction substantially transversal to the direction of displacement, a locking member loosely located in said bore between the scale blade and the one end of said rotatable clamp lever and abutting one end and a spring located in said slider to press upon the opposite end of said rotatable lever and to thereby force said locking member into braking contact with said scale blade.

2. A locking device for measuring sliders and particularly caliper sliders having a scale blade including an elongated straight surface and a slider which are displaceable relative to each other comprising a clamp lever rotatably supported on the slider, said slider having a bore extending in a direction substantially transversal to the longitudinal exterior of said surface, a pin loosely located in said bore between said surface of the scale blade and the one end of said rotatable clamp lever and abutting said one end and a spring located in said slider to press upon the opposite end of said rotatable lever and to thereby force the pin into braking contact with said straight surface of the scale blade.

3. A locking device for calipers having a scale blade and a slider which are displaceable relative to each other comprising a two arm clamp lever embracing the slider and rotatably supported on the same at a spaced relationship, a gib between the scale blade and the slider, said slider having a bore extending in a direction substantially transversal to the direction of displacement, said gib having a bore alined with said bore in the slider, a pin loosely located in said bores between the scale blade and the one end of said rotatable lever and abutting said one end and a spring located in said slider to press upon the opposite end of said rotatable lever and to thereby force the pin into braking contact with said scale blade.

4. A locking device for calipers having a scale blade and a slider which are displaceable relative to each other, comprising a shaft fixedly mounted in the slider, said shaft protruding at its both ends over the width of said slider, a two arm clamp lever embracing the slider and rotatably supported upon the protruding ends of said shaft at a spaced relationship from said slider, a gib between the scale blade and the slider, said slider having a bore extending in a direction substantially transversal to the direction of displacement, said gib having a bore alined with the bore in said slider, a pin loosely located in said bores between the scale blade and the one end of said rotatable lever and abutting said one end and a spring located in said slider to press upon the opposite end of said rotatable lever and to thereby force the pin into braking contact with said scale blade.

5. A locking device for calipers having a scale blade and a slider which are displaceable relative to each other comprising a two arm clamp lever embracing the slider and rotatably supported on the same at a spaced relationship, a gib between the scale blade and the slider, said slider having a bore extending in a direction substantially transversal to the direction of displacement, said gib having a bore alined with the bore in said slider, a pin loosely located in said bores between the scale blade and the one end of said rotatable lever and abutting said one end, a recess in said slider and a recess in the other end of said lever alined with said first recess, a spring located in the said recesses abutting against the inner end faces of the same to press upon the other end of said rotatable lever, to rotate the same and to thereby force the pin into braking contact with said scale blade.

6. In a locking system for use in connection with slide calipers having a scale blade including a straight surface and a slider having a portion adjacent said surface and having a bore, and a gib intermediate said surface and said slider portion: a mechanism, comprising in combination, a shaft journaled in said slider, a straight pin loosely mounted in the bore of said slider portion and protruding through the portion and the gib and being disposed substantially perpendicular to said surface, said pin including two opposite ends and extending with one end to the exterior of said slider and with the other end to said surface and normally abutting there against, said gib having an aperture aligned with said bore for surrounding said other end of said pin, a lever pivoted to said shaft and including near one end a plane spaced from the exterior of said slider and normally abutting against said one end of said pin, said shaft spaced from said pin for a small distance, and a spring disposed between said slider and the other end of said lever, said spring located at a point opposite said pin relative to said shaft and spaced from said shaft for a distance considerably greater than said first mentioned distance and exerting pressure against said other end of said lever to maintain said plane normally in abutment with said pin, said lever swingable about said shaft between two extreme positions of abutment between said plane and said pin, and of abutment between said other end of said lever and the exterior of said slider when manual pressure is exerted against that of the spring to relieve the normal pressure between said plane, said pin, and said surface of the scale and to permit the pin to move in said bore, the space between the two extreme positions of the point of abutment with the pin of said plane being smaller than the thickness of said gib to maintain said pin protruding therethrough and thereby to restrain movement of said gib relative to said slider.

NATHAN SALLY STERN.

REFERENCES CITED

The following references are of record in the file of this patent:

UNITED STATES PATENTS

| Number | Name | Date |
| --- | --- | --- |
| 833,477 | Nelson | Oct. 16, 1906 |
| 883,660 | Marr | Mar. 31, 1908 |
| 1,357,576 | Martet | Nov. 2, 1920 |
| 1,823,045 | Hommel | Sept. 15, 1931 |

FOREIGN PATENTS

| Number | Country | Date |
| --- | --- | --- |
| 9,429 | Great Britain | 1907 |